United States Patent
Alhassan et al.

(10) Patent No.: US 12,440,804 B2
(45) Date of Patent: Oct. 14, 2025

(54) WATER SORBING MATERIALS AND RELATED SYSTEMS AND METHODS

(71) Applicant: Khalifa University of Science and Technology, Abu Dhabi (AE)

(72) Inventors: Saeed Alhassan, Abu Dhabi (AE); Safiya Khalil, Abu Dhabi (AE); Alya Alkaabi, Abu Dhabi (AE); Hamda Alblooshi, Abu Dhabi (AE); Hajar Aljaberi, Abu Dhabi (AE); Hemant Mittal, Abu Dhabi (AE)

(73) Assignee: Khalifa University of Science and Technology, Abu Dhabi (AE)

(*) Notice: Subject to any disclaimer, the term of this patent is extended or adjusted under 35 U.S.C. 154(b) by 378 days.

(21) Appl. No.: 18/020,988

(22) PCT Filed: Aug. 31, 2021

(86) PCT No.: PCT/IB2021/057938
§ 371 (c)(1),
(2) Date: Feb. 13, 2023

(87) PCT Pub. No.: WO2022/049480
PCT Pub. Date: Mar. 10, 2022

(65) Prior Publication Data
US 2023/0285893 A1 Sep. 14, 2023

Related U.S. Application Data

(60) Provisional application No. 63/073,300, filed on Sep. 1, 2020.

(51) Int. Cl.
*B01D 53/04* (2006.01)
*B01D 53/26* (2006.01)
(Continued)

(52) U.S. Cl.
CPC ......... *B01D 53/28* (2013.01); *B01D 53/0438* (2013.01); *B01D 53/261* (2013.01);
(Continued)

(58) Field of Classification Search
CPC .. B01D 53/28; B01D 53/0438; B01D 53/261; B01D 53/02; B01D 53/04; B01D 53/263;
(Continued)

(56) References Cited

U.S. PATENT DOCUMENTS 5,534,186 A * 7/1996 Walker .................. C08J 3/075
96/120
9,440,187 B2 9/2016 Alkhazraji et al.
(Continued)

FOREIGN PATENT DOCUMENTS

| EP | 0922715 A3 | 11/2003 |
| EP | 1873205 A1 | 1/2008 |
| WO | 2018148482 A1 | 8/2018 |

OTHER PUBLICATIONS

"Copper." Chemicool Periodic Table. Chemicool.com. Oct. 16, 2012. Web. Feb. 9, 2023 <https://www.chemicool.com/elements/copper.html>.
(Continued)

*Primary Examiner* — Frank M Lawrence, Jr.
(74) *Attorney, Agent, or Firm* — Billion & Armitage

(57) ABSTRACT

Embodiments include a water collection device (100) comprising one or more water sorbing materials including at least a first thermo-responsive polymer that sorbs water at temperatures above an upper critical solution temperature and desorbs water below the upper critical solution temperature. Embodiments further include a method of harvesting water comprising exposing one or more water sorbing materials to an environment, wherein the one or more water sorbing materials includes at least a first thermoresponsive
(Continued)

polymer that sorbs water at temperatures above an upper critical solution temperature and desorbs water at temperatures below the upper critical solution temperature; and collecting water desorbed from the at least first thermoresponsive polymer.

17 Claims, 2 Drawing Sheets

(51) Int. Cl.
    *B01D 53/28*     (2006.01)
    *E03B 3/28*     (2006.01)
(52) U.S. Cl.
    CPC .......... *E03B 3/28* (2013.01); *B01D 2253/202* (2013.01); *B01D 2259/40088* (2013.01)
(58) Field of Classification Search
    CPC .... B01D 2253/202; B01D 2259/40088; B01D 5/0027; E03B 3/28
    USPC ...... 95/91, 114, 117, 121, 126; 96/108, 121; 34/80, 472, 473
    See application file for complete search history.

(56) References Cited

U.S. PATENT DOCUMENTS

| | | | |
|---|---|---|---|
| 2007/0012186 A1* | 1/2007 | Wilson | B01D 46/0036 95/117 |
| 2007/0203313 A1 | 8/2007 | Nagaoka et al. | |
| 2015/0020687 A1 | 1/2015 | Alkhazraji et al. | |
| 2017/0065930 A1* | 3/2017 | Sakikawa | B01D 53/263 |
| 2018/0171604 A1* | 6/2018 | Kim | B01J 20/3204 |
| 2019/0046918 A1* | 2/2019 | Reinders | B01D 53/28 |
| 2020/0009497 A1* | 1/2020 | Matuska | B01D 53/261 |
| 2021/0069639 A1* | 3/2021 | Wang | B01J 20/0288 |
| 2021/0129075 A1 | 5/2021 | Sakikawa et al. | |
| 2023/0084610 A1* | 3/2023 | Wong | B01D 53/28 95/121 |
| 2024/0109025 A1* | 4/2024 | Zhao | B01J 20/3272 |

OTHER PUBLICATIONS

"Datasheets. N,N'-Methylenebis-Acrylamide MSDS", Last accessed Feb. 9, 2023, 8 pages.
"International Search Report and Written Opinion Received mailed Nov. 10, 2021", Nov. 10, 2021, 10 pages.
"Solution Polymerization", http://polymerdatabase.com/polymer%20chemistry/Solution%20Polymerization.html last accessed Feb. 9, 2023, 2015.
Homepage, S., et al., "Demister Mist Eliminator", Made-in-China. com, 2019, https:/saiptech.en.made-in-china.com/product/YvoQfJVCuTrt/China-Demister- Mist-Eliminator.html.
Horst, R., et al., "Thermodynamics of Polymer Solutions", Phenomenology, 27 pages, date not provided.
"Ammonium persulfate," NeuroImage. [Online]. Available: https://www.sciencedirect.com/topics/engineering/ammonium-persulfate.
"Pluronic@ F127 Prill | DeWolf Chemical an Azelis Company," DeWolf Chemical. Available: https://dewolfchem.com/shop/pluronic-f127-prill/.
"TEMED," Thermo Fisher Scientific. [Online]. Available: https://www.thermofisher.com/order/catalog/product/17919.
"Brasses—the generic term for a range of copper-zinc alloys.", European Copper Institute. (2019). Available at: https://copperalliance.org.uk/about-copper/copper-alloys/brasses/.
Alzari, et al., "Stimuli-Responsive Polymer Hydrogels Containing Partially Exfoliated Graphite", Journal of Polymer Science: Part A: Polymer Chemistry, vol. 48, 5375-5381 (2010), Oct. 1, 2010.
Asadujjaman, et al., "Phase transition and aggregation behaviour of an UCST-type copolymer poly(acrylamide-coacrylonitrile) in water: effect of acrylonitrile content, concentration in solution, copolymer chain length and presence of electrolyte", Soft Matter, 2017, 13, 658-669, Dec. 20, 2016.
Catalanotti, et al., "The Radiative Cooling of Selective Surfaces", Solar Energy, vol. 17, pp. 83-89. Pergamon Press 1975.
Drozdov, et al., "Modeling the effects of temperature and pH on swelling of stimuli-responsive gels", European Polymer Journal 73 (2015) 278-296, Oct. 20, 2015.
Echeverria, et al., "UCST Responsive Microgels of Poly(acrylamide-acrylic acid) Copolymers: Structure and Viscoelastic Properties", Macromolecules 2009, 42, 9118-9123, Oct. 27, 2009.
Fauzi, et al., "Effect of Sodium Bicarbonate as Blowing Agent on Production of Epoxy Shape Memory Foam using Aqueous Processing Method", Sains Malaysiana 44(6)(2015): 869-874.
Galin, et al., "Poly(sulphopropylbetaines): 3. Bulk properties", Polym e r, 1 987, vol. 28, October, 1937-1944.
Kim, et al., "Water harvesting from air with metal-organic frameworks powered by natural sunlight", Science 10.1126/science.aam8743 (2017).
Kontogeorgis, et al., "Thermodynamics of Polymer Solutions", Handbook of Surface and Colloid Chemistry Fourth Edition CRC Press, Accessed on: Apr. 13, 2023, Jun. 25, 2015.
Mah, et al., "Thermo-Responsive Hydrogels for Stimuli-Responsive Membranes", Processes 2013, 1, 238-262; doi:10.3390/pr1030238, Sep. 30, 2013.
Maitra, et al., "Cross-linking in Hydrogels—A Review", American Journal of Polymer Science 2014, 4(2): 25-31, Published online at http://journal.sapub.org/ajps., Jan. 2014.
Mary, et al., "Reconciling Low- and High-Salt Solution Behavior of Sulfobetaine Polyzwitterions", J. Phys. Chem. B 2007, 111, 7767-7777, Jun. 19, 2007.
Niskanen, et al., "How to manipulate the upper critical solution temperature (UCST)?", Polym. Chem., 2017, 8, 220-232., Oct. 21, 2016.
Rao, et al., "Stimuli Responsive Poly(Vinyl Caprolactam) Gels for Biomedical Applications", Gels 2016, 2, 6; doi:10.3390/gels2010006, Jan. 25, 2016.
Seuring, et al., "Polymers with Upper Critical Solution Temperature in Aqueous Solution: Unexpected Properties from Known Building Blocks", ACS Macro Lett. 2013, 2, 597-600, Jun. 13, 2013.
Shimada, et al., "Smart hydrogels exhibiting UCST-type volume changes under physiologically relevant conditions", RSC Adv., 2014, 4, 52346-52348, Oct. 9, 2014.
Siva, et al., "Sodium salt admixtures for enhancing the foaming characteristics of sodium lauryl sulphate", Cement & Concrete Composites 57 (2015) 133-141, Jan. 6, 2015.
Strandman, et al., "Self-Healing Supramolecular Hydrogels Based on Reversible Physical Interactions", Gels 2016, 2, 16; doi: 10.3390/gels2020016, Apr. 8, 2016, 1-31.
Taylor, et al., "Thermoresponsive Gels", Gels 2017, 3, 4; doi: 10.3390/gels3010004, Jan. 10, 2017, 1-31.
Yoshida, et al., "Evolution of self-oscillating polymer gels as autonomous polymer systems", NPG Asia Materials (2014) 6.

* cited by examiner

WATER SORBING MATERIALS AND RELATED SYSTEMS AND METHODS

BACKGROUND OF THE INVENTION

Water is one of the most important resources for human and all known forms of lives on earth. Without water, most of the lives on earth, including human beings, are going to cease to exist. It seems that there are enough water resources on earth, as over 71% of the earth surface is covered by water. However, two factors make water become a scarce resource for most humans on earth.

First, not every types of water are similar. Human being and most other life forms as well, can only drink or use fresh water. However, on earth, 96.5% of the planet's water is found in seas and oceans. Only 2.5% of the earth's water is fresh water, and 98.8% of the fresh water is in ice and groundwater, which are not easily accessible. And less than 0.3% of the freshwater is in rivers, lakes and etc. Accordingly, only a very tiny portion of the total water on earth can be directly used by human.

Second, such small portion of fresh water is not evenly distributed among different regions. As for the regions with large freshwater body, such as river or lake, the fresh water supply may not be an issue. However, for many other regions where there is no river and lake nearby, and most of them being desert or other kind of arid areas, the availability of fresh water is a big concern, or even a health or life-threatening issue. Moreover, even for the people to whom the availability of fresh water is not an issue, the quality of the fresh water may still be a big problem. Many of such rivers and lakes have already been polluted by industrial wastes, agricultural chemicals such as fertilizer and pesticides.

Water is the indispensable resource for human lives, as well as for most of the human activities, including drinking, washing, agriculture irrigation, industrial applications . . . etc. So, on one hand, human need more and more freshwater to support the life, activity and production. On the other hand, the availability and quality of fresh water is a serious issue.

In light of the foregoing, a wide variety of approaches have been developed to get more fresh water from other sources, such as brine in the ocean and the humidity in the atmosphere. Sea water desalination is a field with many well-developed technologies, such as reverse osmosis, forward osmosis, molecular screening, electromagnetic deionization, vacuum distillation, multi-stage flash distillation, vapor compression desalination . . . etc. In many countries, sea water desalination is a vital source of fresh water supply. The world's largest desalination plant is the Jebel Ali Desalination Plant in the United Arab Emirates. However, all of the desalination processes are energy intensive and costly, hence these methods have major drawbacks. In addition, no matter how the desalination technology will be developed in the future, the fundamental physics law determines that a minimum energy consumption is a must, and it cannot be less than 1 kWh/m$^3$.

Therefore, concerning the costs, the other approach that collects water from the atmosphere becomes more favorable; and this is especially true for the areas with the environmental and weather condition suitable for such an approach, such as many coastal arid areas and desert areas around the world.

In addition, due to the perpetual water cycle (hydrologic cycle) on earth, the water (moisture) in the atmosphere is inexhaustible and dynamic. The water is continuously exchanged between the atmosphere, soil water, surface water, groundwater, and plants. During this process, the water evaporates from oceans, rivers, lakes and other water bodies into the air. So the resource of moisture is always available for water collection.

Accordingly, one objective of the present invention is to design a new device for the water collection from the atmospheric moisture with the minimal energy input by humans and minimum human intervention and minimum maintenance, as well as utilizing the specific material with suitable properties as the water sorbing material in the device, so as to achieve the aforementioned objective.

SUMMARY OF THE INVENTION

According to one or more aspects of the invention, a water collection device may include one or more water sorbing materials including at least a first thermo-responsive polymer that sorbs water at temperatures above an upper critical solution temperature and desorbs water below the upper critical solution temperature.

According to one or more further aspects of the invention, a method of harvesting water may include exposing one or more water sorbing materials to an environment, wherein the one or more water sorbing materials includes at least a first thermo-responsive polymer that sorbs water at temperatures above an upper critical solution temperature and desorbs water at temperatures below the upper critical solution temperature; and collecting water desorbed from the at least first thermo-responsive polymer.

DETAILED DESCRIPTION

Figure 1:
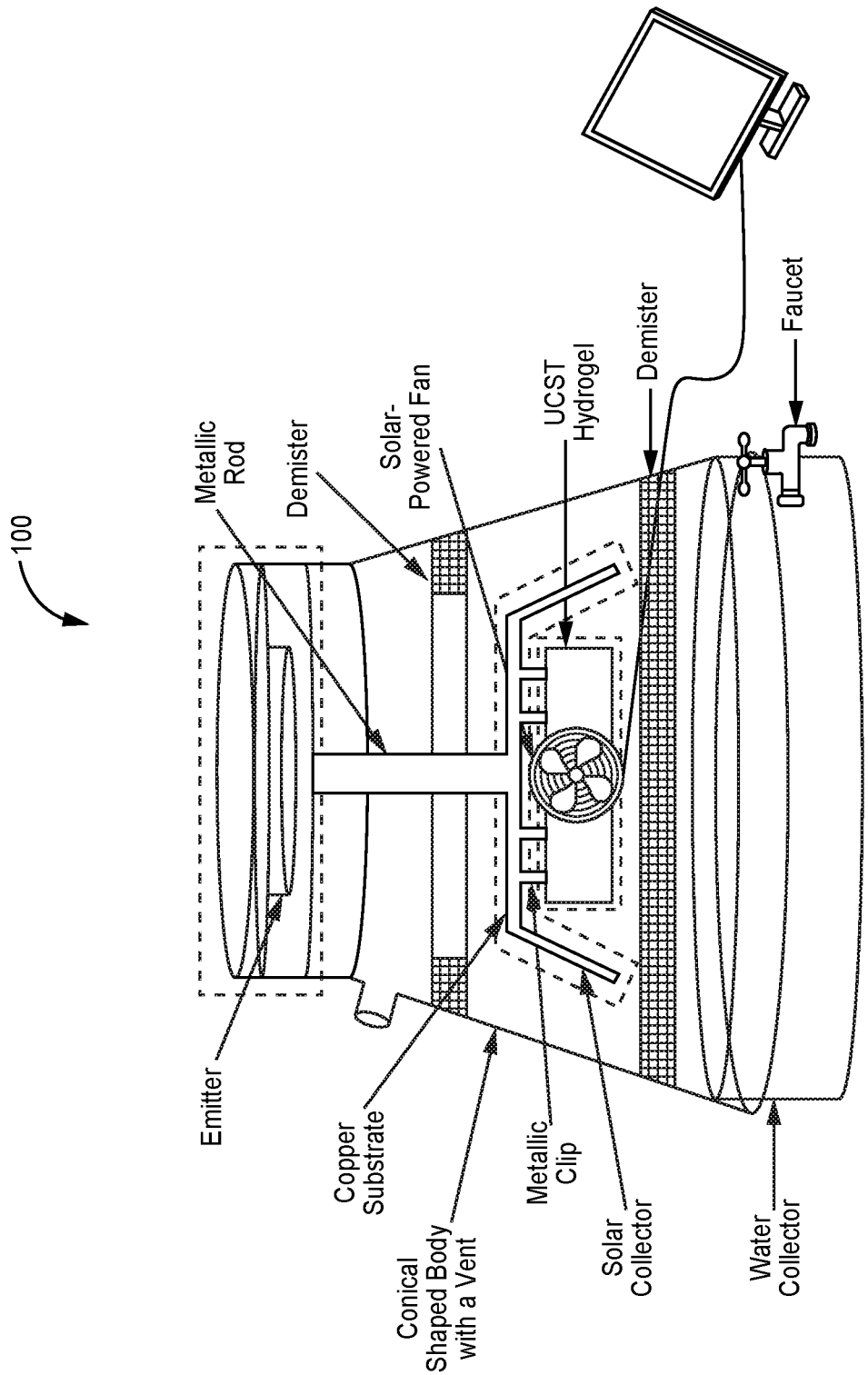
FIG. 1 illustrates a schematic diagram of a water collection device in accordance with one or more embodiments of the invention.

The present invention relates to water-sorbing materials that enhance the water collection efficiency and reduce the energy requirements of water collection devices configured to produce water from atmospheric moisture. The water collection devices disclosed herein may utilize various water sorbing materials, such as thermo-responsive polymers, including thermo-responsive hydrogels, as sponge-like water sorbents. The water collection devices disclosed herein may be used to capture and release water (e.g., moisture, such as atmospheric moisture) from an environment in response to small variations in temperature. The water collection devices disclosed herein may operate autonomously and/or passively, with zero or near zero energy requirements. The water collection devices disclosed herein are capable of condensing water without the energy-intensive regeneration steps required by commercial adsorbents. In addition, the water collection devices may operate using energy generated solely from solar radiation. Furthermore, the water released by said water harvesting devices is a highly pure form of molecular water which may easily be converted into potable drinkable water by the addition of salts or used in any of a wide array of other types of applications. For example, the water may be delivered and used for agricultural purposes, among many others.

Embodiments thus include water sorbing materials and water collection devices including said water sorbing materials. The water collection devices may include one or more water sorbing materials. In some embodiments, one or more water sorbing materials is used to capture (e.g., via sorption) and release (e.g., via desorption) water (e.g., moisture, such as atmospheric moisture and/or humidity) from an environment. In some embodiments, the release of captured water from the one or more water sorbing materials produces liquid water. For example, in some embodiments, the one or more water sorbing materials condenses moisture in the air to liquid water in response to small variations in temperature. In some embodiments, the one or more water sorbing materials is used for sorbing water from an environment at a first temperature (e.g., at a temperature above and/or below a critical solution temperature, as discussed in more detail below) and desorbing water at a second temperature (e.g., at a temperature below and/or above a critical solution temperature, as also discussed in more detail below) to produce liquid water. In some embodiments, the capturing and/or releasing of water (e.g., the sorbing and/or desorbing of water) using the one or more water sorbing materials occurs autonomously, without human intervention, and/or passively.

The one or more water sorbing materials may each independently include one or more thermo-responsive polymers, including thermo-responsive hydrogels. For example, in some embodiments, the water collection devices include one or more polymers exhibiting upper critical solution temperature (UCST) behavior. In some embodiments, UCST polymers exhibit a UCST in water (e.g., pure water). UCST polymers, including UCST hydrogels, may be configured to capture moisture from an environment at temperatures above the UCST (e.g., during daytime) and to release the captured moisture at temperatures below the UCST (e.g., during nighttime). In some embodiments, the water collection devices further include one or more polymers exhibiting lower critical solution temperature (LCST) behavior. LCST polymers, including LCST hydrogels, are similar to the UCST polymers except LCST polymers capture moisture at temperatures below the LCST (e.g., during nighttime) and release the captured moisture at temperatures above the LCST (e.g., during daytime). By incorporating UCST polymers and optionally LCST polymers into the water collection devices, said water collection devices may achieve water production rates that far exceed the water production rates of conventional devices.

The thermo-responsive polymers disclosed herein may undergo a water solubility change, or phase transition, in response to changes in temperature. This water solubility change may be exploited via sorption and desorption processes to capture moisture from an environment and condense, or release, it to produce water. This may be achieved autonomously without human intervention and with minimal or no energy requirements. Polymers, including hydrogels, that exhibit UCST behavior may switch between a hydrophobic state and a hydrophilic state in response to changes in temperature. That is, above the upper critical solution temperature ($T_{UCST}$), the UCST polymers, including UCST hydrogels, may sorb water from an environment, and below the upper critical solution temperature, the UCST polymers may desorb water. Polymers, including hydrogels, may also exhibit Lower Critical Solution Temperature (LCST) behavior. LCST behavior may involve a similar switch between a hydrophobic state and a hydrophilic state in response to changes in temperature, except LCST polymers, including LCST hydrogels, may sorb water below a lower critical solution temperature ($T_{LCST}$) and may desorb water above the lower critical solution temperature. In general, sorbing may refer to a process by which a substance is captured by or associates with another substance (e.g., adsorption and/or absorption), whereas desorbing may refer to a process by which a substance is released from another substance.

While not wishing to be bound to a theory, in some embodiments, it is believed that the mechanism by which the thermo-responsive polymers sorb and desorb water may involve the formation (and breaking) of hydrogen bonds in response to changes in temperature. More specifically, it is believed that changes in temperature cause the thermo-responsive polymers to switch between a hydrophobic state and a hydrophilic state, where switching to a hydrophilic state tends to favor the formation of hydrogen bonds with water and where switching to a hydrophobic state tends to favor the breaking of hydrogen bonds with water. The temperatures at which this switch between hydrophobic and hydrophilic states occurs and each polymer's behavior in response to that switch may depend on whether the polymer exhibits UCST behavior or LCST behavior. In general, a UCST polymer or hydrogel may sorb water above an upper critical solution temperature and desorb water below the upper critical solution temperature. A LCST polymer or hydrogel may sorb water below a lower critical solution temperature and desorb water above the lower critical solution temperature.

For example, in some embodiments, a thermo-responsive polymer exhibiting LCST behavior may sorb water at temperatures below $T_{LCST}$ and desorb water at temperatures above $T_{LCST}$. As the temperature of an environment decreases from above $T_{LCST}$ to below $T_{LCST}$, the thermo-responsive polymer may switch from a hydrophobic state to a hydrophilic state. In the hydrophilic state, the thermo-responsive polymer tends to favor the formation of hydrogen bonds with water and thus may switch from a shrunken dehydrated state to a swollen hydrated state. As the temperature of the environment increases from below $T_{LCST}$ to above $T_{LCST}$, the thermo-responsive polymer may switch from the hydrophilic state to the hydrophobic state. In the hydrophobic state, the thermo-responsive polymer tends to break hydrogen bonds with water and thus may switch from the swollen hydrated state to the shrunken dehydrated state. During this switch, the thermo-responsive polymer may desorb or expel water from its structure, producing water that may be collected and used for various purposes. In some embodiments, the thermo-responsive polymer forms hydrogen bonds with proximal or adjacent moieties which may also be attached to the thermo-responsive polymer.

In some embodiments, a thermo-responsive polymer exhibiting UCST behavior may sorb water at temperatures above $T_{UCST}$ and desorb water at temperatures below $T_{LCST}$. As the temperature of an environment increases from below $T_{UCST}$ to above $T_{UCST}$, the thermo-responsive polymer may switch from a hydrophobic state to a hydrophilic state. In the hydrophilic state, the thermo-responsive polymer tends to favor the formation of hydrogen bonds with water and thus may switch from a shrunken dehydrated state to a swollen hydrated state. As the temperature of the environment decreases from above $T_{UCST}$ to below $T_{UCST}$, the thermo-responsive polymer may switch from the hydrophilic state to the hydrophobic state. In the hydrophobic state, the thermo-responsive polymer tends to break hydrogen bonds with water and thus may switch from the swollen hydrated state to the shrunken dehydrated state. During this switch, the thermo-responsive polymer may desorb or expel water from its structure, producing water that may be collected and used for various purposes. In some embodiments, the thermoresponsive polymer forms hydrogen bonds with proximal or adjacent moieties which may also be attached to the thermo-responsive polymer.

The upper critical solution temperature of the one or more UCST polymers, including UCST hydrogels, may be in the range of about −15° C. to about 100° C. (inclusive), including any incremental value or subrange between that range. For example, in some embodiments, $T_{UCST}$ may range from about −15° C. to about 0° C., about −10° C. to about 0° C., about −5° C. to about 0° C., about −5° C. to about 5° C., about 0° C. to about 10° C., about 0° C. to about 15° C., about 0° C. to about 20° C., about 5° C. to about 15° C., about 5° C. to about 15° C., about 10° C. to about 20° C., about 10° C. to about 25° C., about 15° C. to about 30° C., about 15° C. to about 35° C., about 15° C. to about 40° C., about 10° C. to about 40° C., about 15° C. to about 40° C., about 20° C. to about 40° C., about 25° C. to about 40° C., and the like. In some embodiments, $T_{UCST}$ is about −15° C. or less, about −5° C., about 0° C., about 5° C., about 10° C., about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., about 30° C., about 31° C., about 32° C., about 33° C., about 34° C., about 35° C., about 36° C., about 37° C., about 38° C., about 39° C., or about 40° C. In one example, the range may be between 5° C. and 75° C.

If present, the lower critical solution temperature of the one or more LCST polymers, including LCST hydrogels, may be in the range of about −15° C. to about 100° C. (inclusive), including any incremental value or subrange between that range. For example, in some embodiments, $T_{LCST}$ may range from about −15° C. to about 0° C., about −10° C. to about 0° C., about −5° C. to about 0° C., about −5° C. to about 5° C., about 0° C. to about 10° C., about 0° C. to about 15° C., about 0° C. to about 20° C., about 5° C. to about 15° C., about 5° C. to about 15° C., about 10° C. to about 20° C., about 10° C. to about 25° C., about 15° C. to about 30° C., about 15° C. to about 35° C., about 15° C. to about 40° C., about 10° C. to about 40° C., about 15° C. to about 40° C., about 20° C. to about 40° C., about 25° C. to about 40° C., and the like. In some embodiments, $T_{LCST}$ is about 40° C., about 39° C., about 38° C., about 37° C., about 36° C., about 35° C., about 34° C., about 33° C., about 32° C., about 31° C., about 30° C., about 29° C., about 28° C., about 27° C., about 26° C., about 25° C., about 24° C., about 23° C., about 22° C., about 21° C., about 20° C., about 19° C., about 18° C., about 17° C., about 16° C., or about 15° C.

In some embodiments, the lower critical solution temperature is greater than the upper critical solution temperature. In these embodiments, the UCST polymer and the LCST polymer may sorb water simultaneously at temperatures between the upper critical solution temperature and the lower critical solution temperature. In some embodiments, the lower critical solution temperature is about the same as, or is equal to, the upper critical solution temperature. In some embodiments, the lower critical solution temperature is less than the upper critical solution temperature. In some of these embodiments, the LCST polymer and the UCST polymer may not sorb any water at temperatures between the lower critical solution temperature and the upper critical solution temperature.

Thermo-responsive polymers which exhibit UCST behavior and which are suitable for use in the water collection devices are not particularly limited provided that they may sorb and desorb water, for example, in response to changes in temperature as described above. Examples of thermo-responsive polymers include, without limitation, non-crosslinked polymers, crosslinked polymers such as hydrogels, as well as various homopolymers and copolymers, examples of which include linear copolymers, such as block copolymers, alternating copolymers, periodic copolymers, statistical copolymers, random copolymers, and gradient copolymers; branched copolymers, such as brush copolymers and comb copolymers; and graft copolymers, such as start copolymers. In some embodiments, said thermo-responsive UCST polymers include at least one amorphous polymer. In some embodiments, the thermo-responsive polymers include self-oscillating polymers.

In some embodiments, a thermo-responsive polymer exhibiting UCST behavior includes one or more of poly (acrylamide), poly(acrylic acid), poly(N-acryloylaspara-gineamide), poly-3-dimethyl(methacryloyoxyethyl) ammonium propane sulfonate, polymethacrylamide, poly(N-acetylacrylamide), poly(acrylonitrile), polyvinyl alcohol, polystyrene, polyisoprene, polypropylene oxide, polybutadiene, polydimethyl siloxane, poly(sulfobetaine), poly(ethylene oxide), poly(vinyl methyl ether), hydrophobically modified poly(vinyl alcohol), poly(hydroxyethylmethacrylate), poly(uracilacrylate), poly(N-acryloylglutamineamide, and poly(N-methacryloylasparagineamide). In some embodiments, the thermo-responsive polymer exhibiting UCST behavior includes one or more of poly(acrylamide-acrylic acid) copolymers, poly(N-acryloylasparagineamide), poly-3-dimethyl(methacryloyloxyethyl) ammonium propane sulfonate, polymethacrylamide, poly(methacrylamide-N-acetylacrylamide) copolymers, poly(arylamide-N-acetylacrylamide) copolymers, poly(acrylamide-co-acrylonitrile) copolymers, poly((meth)acrylamide-co-N-acetylacrylamide), and the like. In some embodiments, the thermo-responsive polymer exhibiting UCST behavior within a temperature range of about 20 degrees C. to about 40 degrees C. in pure water includes one or more of poly(acrylamide-acrylic acid) copolymers, poly(N-acryloylasparagineamide), poly (soap), poly(methacrylamide-N-acetylacrylamide) copolymers, poly(arylamide-N-acetylacrylamide) copolymers, and poly(acrylamide-co-acrylonitrile) copolymers. For example, in some embodiments, poly(acrylamide-co-acrylic acid) is used.

In some embodiments, the thermo-responsive polymer includes poly(acrylamide-acrylic acid) copolymers, or poly (AAm-co-AAc). In some embodiments, poly(AAm-co-AAc) is a super porous hydrogel (SPH). In some embodiments, poly(AAm-co-AAc) is prepared from or the reaction product of a solution including one or more of the following materials: acrylamide as monomer, acrylic acid as comonomer, N,N'-methylenebis(acrylamide) (MBA) as crosslinking agent, pluronic (PF-127) as foam stabilizer, ammonium peroxodisulfate (APS) as initiator, water (Millipore Milli-Q grade) as aqueous solvent, tetramethylethylenediamine (TEMED) as accelerator, sodium bicarbonate ($NaHCO_3$) as foaming agent, and sodium hydroxide (NaOH) as foaming agent.

The UCST polymers may achieve hydrogel performance beyond the limits of the polymer. For example, the sorption (absorption and/or adsorption)/desorption cycle and capacity of the UCST polymers may be improved and optimized by adjusting and/or modulating the configuration, additives, and response time, among other things.

In some embodiments, the UCST polymers and LCST polymers may be used to autonomously condense the moisture and/or humidity in the air to liquid water in response to a small change in temperature (e.g., as self-oscillating polymers), thereby eliminating the energy-intensive regeneration step of commercial adsorbents. In some embodiments, the liquid water formed is the purest form of molecular water and may be simply converted to drinkable water with the addition of salts. In some embodiments, the UCST polymers disclosed herein possess technological and economic advantages over other polymeric materials. For example, unlike existing technologies, such as water desalination technologies, which requires a minimum energy consumption of 1 kWh/m$^3$, the UCST polymers disclosed herein are highly efficient, reliable, and do not require input energy except for solar radiation. Accordingly the incorporation of UCST polymers with LCST polymers into a passive water harvesting device and/or water collecting device provides access to a greater quantity of water.

Similarly, thermo-responsive polymers which exhibit LCST behavior and which are suitable for use in the water collection devices are not particularly limited provided that they may sorb and desorb water, for example, in response to changes in temperature as described above. Examples of thermo-responsive polymers include, without limitation, non-crosslinked polymers, crosslinked polymers such as hydrogels, as well as various homopolymers and copolymers, examples of which include linear copolymers, such as block copolymers, alternating copolymers, periodic copolymers, statistical copolymers, random copolymers, and gradient copolymers; branched copolymers, such as brush copolymers and comb copolymers; and graft copolymers, such as start copolymers. In some embodiments, the thermo-responsive polymers include self-oscillating polymers.

In some embodiments, the thermo-responsive polymer that exhibits LCST behavior includes poly(N-isopropylacrylamide), or PNIPAM or NIPA for short, which may have the following molecular formula: $(C_6H_{11}NO)_n$. In water, it forms a three-dimensional hydrogel. When heated in water to 32° C. (90° F.) or above, which is the phase separation temperature, it undergoes a reversible phase transition from a swollen hydrated state to a shrunken dehydrated state, losing about 90% of its volume. In dilute solution, it undergoes a corresponding coil-to-globule transition at similar conditions. In this way, the water sorbing materialp(N-isopropylacrylamide) may automatically remove the collated water from itself when the temperature reaches 32° C. (90° F.) or higher. Moreover, when the temperature drops to below 32° C., the poly(N-isopropylacrylamide) may automatically sorb the moisture from the air again. The fundamental mechanism is that at the temperature below the phase separation temperature, the polymer forms hydrogen bond with the water ($H_2O$). So, it is able to sorb a large amount of water. While when the temperature becomes higher than that critical point (phase separation temperature), the polymer forms hydrogen bond with the side groups of another adjacent Poly(N-isopropylacrylamide) molecule. Accordingly, it will expel the water from its structure. In addition, in the stage of water sorbing (low temperature), when a $H_2O$ molecule binds to the polymer via an hydrogen bond, a specific space steric conformation will be formed, and such structure is actually favorable for the next $H_2O$ molecule to bind to the same polymer next to the first $H_2O$ molecule. That is why poly(N-isopropylacrylamide) may sorb a huge amount of water from the atmosphere. In such a way, the sorbing material in the device works like a self-propelled pump to continuously pump the water from the atmospheric air to the water container of the present invention. In some embodiments, modified forms of poly(N-isopropylacrylamide) and poly(vinylphosphonate) may be used. They could be used to replace Poly(N-isopropylacrylamide) as the water sorbing material in the device of the present invention.

Further examples could be hydroxypropylcellulose, poly(vinylcaprolactame) and polyvinyl methyl ether. All of them have shown temperature responsive properties in the aqueous solution. In addition, the choice of thereto-responsive polymer is not limited to linear forms of the polymer, it also include other architectural arrangements such as crosslinked form, brushes, graft copolymer, random copolymer, etc. Thus they may be used as the water sorbing materials of the water collection device.

Additional examples of thermo-responsive polymers which exhibit LCST behavior include, without limitation, one or more poly(N-alkylacrylamides), poly(N,N dialkylacrylamides), poly(acrylic acids), poly(vinyl ethers), or poly(vinylcaprolactams). In some embodiments, thermo-responsive polymers derived from one or more monomers are used, such as those derived from N-alkylacrylamides, N,N-dialkylacrylamides, vinyl ethers, acrylic acid, vinylcaprolactam, and the like. In some embodiments, the thermo-responsive polymer may further include monomers such as acrylic acid and/or acrylamide. The N-alkylacrylamide may be an N—$C_1$-$C_4$alkylacrylamide, the N,N-dialkylacrylamide may be an N,N-di($C_1$-$C_4$)alkylacrylamide. The alkyl groups in in the N,N-dialkylacrylamides may be the same, or may be different. When the thermo-responsive polymer is a copolymer, it may be a random copolymer or block copolymer. Exemplary thermo-responsive polymers may be derived from N-alkylacrylamide and/or N,N-dialkylacrylamide monomers, and may further be derived from acrylic acid, including salts thereof, and/or acrylamide. The thermo-responsive polymer may be derived from one or more monomers such as methylacrylamide, ethylacrylamide, n-propylacrylamide, iso-propylacrylamide, n-butylacrylamide, iso-butylacrylamide, sec-butylacrylamide, tert-butylacrylamide, dimethylacrylamide, diethylacrylamide, di-n-propylacrylamide, di-iso-propylacrylamide, N-methyl-N-ethylacrylamide, N-methyl-N-n-propylacrylamide, N-ethyl-N-n-propylacrylamide, N-methyl-N-iso-propylacrylamide, and N-ethyl-N-iso-propylacrylamide. In some instance, the thermo-responsive polymer is derived from monomers including N-isopropylacrylamide or N,N-diethylacrylamide, and may further include monomers of acrylamide and/or acrylic acid. In certain embodiments, the thermo-responsive polymer may include block copolymers of polyethylene oxide and polypropylene oxide.

In some embodiments, the thermo-responsive polymer may include a crosslinked polymer. Crosslinked polymers may be obtained by polymerizing the monomers in the presence of one or more crosslinking monomers or crosslinking agents. Crosslinked polymers may be derived from one or more monomers having two or more vinyl groups. In some instance, the crosslinking monomer will contain two, three, four, five or six vinyl groups. Exemplary crosslinking monomers include ($C_1$-$C_{10}$alkylene)bisacrylamide, such as N,N-methylenebisacrylamide, N,N-ethylenebisacrylamide, N,N-propylenebisacrylamide, and functionalized acrylamides including mono and di-($C_3$-$C_{10}$alkenyl) acrylamide such as N-allylacrylamide or N,N-diallylacrylamide. The molar ratio of crosslinking monomers to other monomers may be from 1:10000 to 1:100, from 1:5000 to 1:100, from 1:2500 to 1:100, from 1:2000 to 1:100, from 1:1500 to 1:100, from 1:1000 to 1:100, from 1:750 to 1:100, from 1:500 to 1:100, from 1:250 to 1:100, from 1:5000 to 1:500, from 1:5000 to 1:1000, from 1:5000 to 1:2500, from 1:5000 to 1:3,000, from 1:4000 to 1:1000, from 1:4000 to 1:2000, from 1:7500 to 1:2500, or from 1:10000 to 1:5000.

In some embodiments, the upper critical solution temperature and/or lower critical solution temperature may be adjusted by changing the concentration, structure, and/or type of thermo-responsive polymer. For example, in some embodiments, the concentration of one or more monomers and/or one or more comonomers may be adjusted to adjust the upper critical solution temperature and/or lower critical solution temperature. In some embodiments, different monomers and/or comonomers are selected to adjust the upper critical solution temperature and/or lower critical solution temperature. By virtue of change the concentration of the polymer, the phase separation temperature (e.g., the upper critical solution temperature and/or lower critical solution temperature) may be modified within the ranges described herein. Such property is very useful in order to make the water sorbing material, as well as the water collection device, function in different areas or regions of the world, and under different climate conditions.

In some embodiments, the water sorbing material is grafted on or to a substrate. For example, in some embodiments, one or more UCST polymers, including UCST hydrogels, are grafted on or to a substrate. In some embodiments, one or more LCST polymers, including LCST hydrogels, are grafted on or to a substrate.

In some embodiments, the water sorbing material includes a UCST hydrogel with a UCST of about 22 degrees C. In some embodiments, the UCST polymer and/or USCT hydrogel will desorb about 95% of the adsorbed water. In some embodiments, the UCST polymer and/or UCST hydrogel has a uniform pore size distribution. In some embodiments, the inlet air stream has about 60% moisture.

In some embodiments, a water collection device comprises an upper critical solution temperature polymer that sorbs water (e.g., water, water vapor, moisture, etc. from an environment) at temperatures above an upper critical solution temperature and desorbs water at temperatures below the upper critical solution temperature. In some embodiments, the upper critical solution temperature polymer includes an upper critical solution temperature hydrogel. In some embodiments, the upper critical solution temperature hydrogel includes poly(AAm-co-Ac). In some embodiments, the water collection device further comprises a lower critical solution temperature polymer that sorbs water (e.g., water, water vapor, moisture, etc. from an environment) at temperature below a lower critical solution temperature and desorbs water at temperatures above the lower critical solution temperature. In some embodiments, the lower critical solution temperature polymer includes a lower critical solution temperature hydrogel. In some embodiments, the lower critical solution temperature polymer includes one or more of poly(N-isopropylacrylamide) (PNIPAM) and poly(vinylphophonate). Any of the other polymers of the present disclosure may be utilized herein without departing from the scope of the present invention.

In addition to including one or more water sorbing materials, the water collection devices disclosed herein may include one or more additional components.

FIG. 1 is a schematic diagram of a water collection device 100, according to one or more embodiments of the present invention. As shown in FIG. 1, the water collection device 100 may include a water sorbing material for capturing and releasing water from an environment in response to variations in temperature, a body for housing the water sorbing material, and a water collector for storing water desorbed, or released, from the water sorbing material. In some embodiments, the water collection device 100 may further include one or more of an emitter, a substrate, a solar panel, a solar-powered fan, a solar collector, a first demister, a second demister, a metallic rod, a metallic clip, and a faucet. For example, in the illustrated embodiment, the water collection device 100 includes a conical shaped body having an upper chamber, a lower chamber, and a water collector. The upper chamber may include a metallic rod having a first surface and a second surface. The first surface may include a top surface positioned within the upper chamber and the second surface may include a bottom surface positioned within the lower chamber. An emitter may be attached to the top surface in the upper chamber. A substrate with solar collectors may be attached to the bottom surface in the lower chamber. The water sorbing material may be attached to the substrate through a metallic clip positioned in the lower chamber. Solar panels of the solar-powered fan may be placed in the upper chamber in a direction adjacent to the metal substrate. A fan may be incorporated into the conical shaped body in the lower chamber beneath the solar panels facing the polymeric sheets. A water collector with two self-opening faucets may be positioned beneath the lower chamber. A first demister and a second demister may be used to prevent any water from escaping.

The body may be used for housing the water sorbing material. The body may serve to protect the water sorbing material, as well as the other components being housed by the body, while also allowing moisture to pass through to the water sorbing material. In some embodiments, the body include a transparent material or at least partially transparent material. In some embodiments, the body includes one or more vents. For example, in some embodiments, the body includes a conical-shaped transparent body with a vent. Other shapes, scales, configurations, and dimensions of the body are permissible and thus the conical shaped transparent body depicted in FIG. 1 shall not be limiting. The conical-shaped transparent body with a vent may include polycarbonate. Polycarbonate may be used for the body of the apparatus because it exhibits good transmission of solar radiation, high heat resistance, high impact strength, durability and shatter resistance, and is relatively lightweight. In other embodiments, glass may be used. In other embodiments, other polymers, glasses, ceramics, and materials may be utilized herein without departing from the scope of the present invention.

In some embodiments, the body allows the moisture or water vapor to pass through easily. In this way, the water sorbing material may get access to the moisture in the air, so as to collect it. The body may include or be a protection wall which may be made of any suitable material. It covers the water sorbing material from being contaminated or damaged from all environmental factors, which may reduce the water collection efficiency of the device. As mentioned before, it may have the means to allow moisture pass through it easily. One way to achieve it is to make the protection wall in a porous form. So, the air with moisture may pass through it easily. On the other hand, the material used to make the protection wall should not sorb water itself; such that the air with moisture may be accessed by the water sorbing material lossless. Finally, in some embodiments, it may be preferred that this body should also allow the sunlight to access to the water sorbing material. In the present invention, the solar energy from sunlight is the only energy required for the entire system. No other energy may be required for the operation.

In some embodiments, the water collector is designed to collect as much water from the water sorbing material as possible. In some embodiments, it may also be made of the material that does not sorb water. So, all of the water collected by the water sorbing material will be transferred to the external for water supply, as well as industrial or agricultural applications. Further, the water collector may have certain means to prevent the collected water from evaporating back to the air again. Such procedures seem simple, yet functionally very important. Otherwise, a significantly portion of the collated water may be lost back to the air before it reaches the end user. The water collector may include any member suitable for holding liquid water. The member material is not particularly limited. For example, in some embodiments, the water collector includes polycarbonate. The water collector may be made of the same material as the body of the design, which is polycarbonate to retain the entire device in unison and due to its low thermal conductivity. However, the water collector may have a greater thickness of polycarbonate than the body to raise its insulation effect and minimize evaporation losses. Other materials may be utilized herein without departing from the scope of the present invention.

In some embodiments, the water collection device 100 further includes an optional passive radiative cooler for cooling the water sorbing material to a temperature below a critical solution temperature. For example, cooling a water sorbing material including a UCST polymer may be effective to initiate one or more desorption cycles. If a LCST polymer is present, cooling the water sorbing material may be effective to initiate one or more sorption cycles. In some embodiments, the radiative cooling subsystem may include a radiator material such as an aluminum sheet coated with polyvinyl fluoride, a polyethylene cover, and Styrofoam as insulator. At least one benefit of using aluminum is that it is generally inexpensive and a practical choice for the radiator surface. Polyvinyl fluoride has advantageous features as a coating material and thus may be used herein. For example, polyvinyl fluoride may provide resistance to weather and staining, and low permeability to vapors. A polyethylene film may be used as a convection cover because it is transparent to infrared in the 8-14 μm waveband. The infrared transmittance and the thermal resistance of 100 μm polyethylene cover may be about 73% and 1.1 $m^2KW^{-1}$, respectively. Lastly, Styrofoam may be used as insulation material due to its ability to confine thermal transfer. Therefore, a structure insulated with Styrofoam will maintain its temperature inside, regardless to the surroundings condition. Other materials may be utilized herein without departing from the scope of the present invention.

In some embodiments, the water collection 100 further includes an optional solar collector for heating the water sorbing material to a temperature above a critical solution temperature. For example, heating a water sorbing material including an upper critical solution temperature (UCST) polymer, including UCST hydrogels, may be effective to initiate one or more sorption cycles. In some embodiments, a lower critical solution temperature (LCST) polymer, including LCST hydrogels, is optionally included in the water sorbing material. In such embodiments, heating a water sorbing material including a LCST polymer may be effective to initiate one or more desorption cycles. In some embodiments, the solar collector includes a flat-plate solar collector. The flat-plate solar collector may include a substrate, such as a copper substrate. The illustrated device may include two collector plates connected by a metallic substrate. Since the metallic substrate contacts the polymer and water directly, copper may be selected as the substrate material due to its excellent corrosion resistance. For the collector plates, the materials may be selected from one or more of copper, aluminum, and stainless steel. Other materials may be utilized herein without departing from the scope of the present invention. Thermal conductivity of the material selected may be beneficial as it will eliminate thermal resistance between the plates and the metallic substrate.

In some embodiments, the water collection device 100 may include a faucet. The faucet is not particularly limited. The faucet may be made of brass which has a high ability to resist heat and corrosion. In other embodiments, other metals, metalloids, metal alloys, and the like may be used herein.

In some embodiments, the water collection device 100 may include a metal clip. The metal clips are not particularly limited. In some embodiments, the metal clips include stainless-steel 304. Stainless-steel 304 exhibits good forming and welding properties, excellent corrosion and oxidation resistance due to chromium content, excellent toughness even at very low temperatures, and has ease of cleaning and fabrication. In some embodiments, the metal clips and/or metal rod include copper. For the metal rod and few metallic clips, copper may be selected for its high corrosion resistance, malleability and ductility, which may be the thinnest and longest, and great thermal conductivity (e.g., relative to stainless steam, copper's thermal conductivity is about 24 times better).

In some embodiments, the water collection device 100 captures water from humidity passively and autonomously with zero energy requirement. The device may incorporate an Upper Critical Solution (UCST) Polymer, such as, Poly-acrylamide-co-acrylic acid. During the daytime, the UCST polymer sponge may be heated with the aid of copper solar collectors, and adsorption of water vapor from humidity may be triggered. In some embodiments, the sponge has an adsorption capacity of about 50% of its own weight. At night, the sponge may be cooled below ambient with the aid of a nighttime radiative cooling system that induces water desorption. The materials that make up the passive cooling system may include an aluminum sheet coated with polyvinyl fluoride layer and covered with polyethylene shield. In some embodiments, a desorption capacity of 50% of the water adsorbed, per sponge, is observed. The UCST polymer may autonomously condenses the moisture in the air to liquid water with response to a small temperature change eliminating the energy-intensive regeneration step of commercial adsorbents. A UCST macro-porous random copolymer may be synthesized, with a UCST (approximated) of about 24 degrees C. In some embodiments, about collection of about 30 sponges may produce about 20.52 L of water per day with the aid of the solar energy. In this way, the water collection devices may be used to produce pure distilled water accessible autonomously, with minimal human intervention, and minimal energy (only solar energy). The device may be constructed using simple commercial materials.

Figure 2:
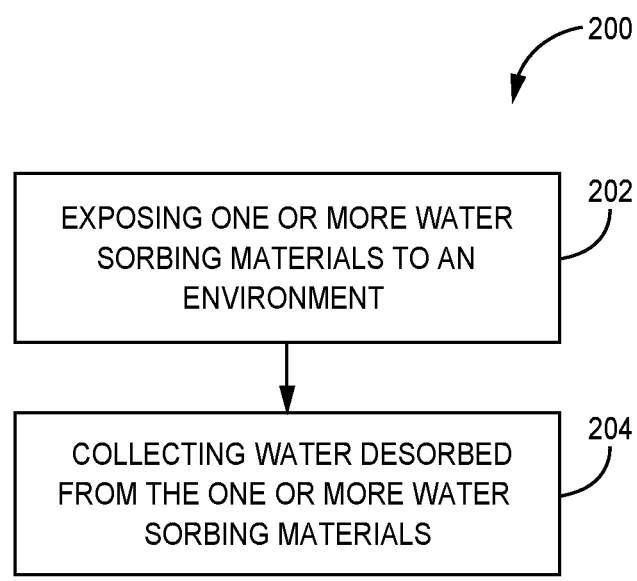
FIG. 2 illustrates a method 200 of harvesting water in accordance with one or more embodiments of the invention.

FIG. 2 is a flowchart of a method of producing water, according to one or more embodiments of the invention. As shown in FIG. 2, the method 200 may include exposing one or more water sorbing materials (e.g., a first water sorbing material and optionally a second water sorbing material) to an environment; and collecting 204 water desorbed from the one or more water sorbing materials. In some embodiments, the water sorbing material includes at least a first water sorbing material and optionally a second water sorbing material. In some embodiments, the first water sorbing material includes an upper critical solution temperature (UCST) polymer as described above. In some embodiments, the second water sorbing material includes a lower critical solution temperature (LCST) polymer as described above. The first and second water-sorbing materials may include any of those disclosed herein. In some embodiments, the environment has a relative humidity (RH) of greater than 0% RH. In some embodiments, the environment includes atmospheric moisture.

In some embodiments, the collected water may be delivered and used for agriculture. In some embodiments, the method may be scaled up and the water may be treated further to form potable water. In some embodiments, the collected water is used for applications in areas such as semiarid and arid areas that are water scarce. In some embodiments, the water, humidity, and/or moisture from an environment is captured during night (e.g., at low temperatures) and during the day (e.g., at high temperatures) using a LCST polymer and UCST polymer, respectively. In some embodiments, the water, humidity, and/or moisture from an environment is released during the day (e.g., at high temperatures) and during the night (e.g., at low temperatures) using a LCST polymer and UCST polymer, respectively. In this way, the incorporation of both UCST polymer and LCST polymer into a passive water harvesting device may provide access to a greater quantity of water in terms of water collection and/or production rates, among other things.

In some embodiments, the method further comprises adding salts to the collected water. In some embodiments, the environment includes atmospheric moisture. In some embodiments, the environment has a relative humidity (RH) of greater than 0% RH. In some embodiments, the water sorbing materials sorbs and desorbs water one or more times.

In some embodiments, the method 200 is performed using the water collection devices disclosed herein. For example, in some embodiments, the water collection device may operate in response to temperature variations throughout the day. In some embodiments, the polymeric desiccants adsorb water vapor from the air during the day and desorb liquid water at night. The temperature range of the polymer during both cycles is amplified with the deployment of solar collectors and a passive radiative cooling system. To begin with, as the sun rises during the day, and shines on the solar panels, current generated drives the motor and supplies a stream of fresh-humid-filtered air directed towards the hydrogel sheets. Meantime, the sun strikes the solar collectors placed sideways to the polymer. As a result, photons reaching the highly absorbing solar collectors increases its internal energy and thus its temperature. The described phenomena result in a temperature gradient along the polymer and the solar collectors inducing heat transfer. The heat transfers from the solar collectors all the way to the polymer sheets through the substrate and metallic clips. The tilt angle of the solar collectors is set such that a desired temperature rise in the polymer is achieved. As the sun sets, and light intensity approaches zero, the fan operation will stop. The latter helps minimize evaporation losses of entrapped water molecules within the hydrogel matrix. The components of the device are orientated such that during the night, the emitter's temperature drops below the hydrogel's UCST as a result of the net radiative cooling power. The latter creates a temperature difference inducing heat transfer across the operating system. Thus, heat is rejected from the polymer along the rod, all the way to the emitter, resulting in a temperature drop of the polymer during night. The aforementioned phenomenon promotes the desorption and regeneration of the adsorbent as the polymeric chains become hydrophobic.

Concerning the regions where the freshwater resource is scarce, a large number of them are the desert areas or coastal arid areas. In such areas, the average daily high temperature is easily becoming higher than 32° C.; while at night, it would be quite lower than 32° C. In addition, in many of such dry coastal areas, the early morning fogs are regular phenomena as the cold and humid air currents travelling from the ocean inwards into the coastal arid area. Since rainfall is scarce there, the application of the device to collect the moisture from the air will significantly contribute to the fresh water supply in those arid areas. A water collection device utilizing one or more of the water sorbing materials disclosed herein has significant advantages in comparison to other freshwater generation approaches.

In some embodiments, during the operation, it does not need any energy input from human to separate the fresh water from dissolved materials, such as salt; it also does not need any energy input from human to remove the collected water from the water sorbing material. Only the natural and sun light (solar radiation) will do all the work to drive the device to function as purported. From night to early morning, the temperature is lower than a first temperature, such as 32° C., the transition temperature, and the humid fog that is rich of moisture, is in the atmospheric air; so the water sorbing material sorbs the moisture from the air. In this way, it collects water from the humid air. Later on, after sunrise, the temperature will rise quickly, and by the noon till the early afternoon, the temperature will be higher than the first temperature, such as 32° C. Thus, the water sorbing material that is the thermo-responsive polymer will automatically undergo conformation change. Accordingly, the water collected in it will be expelled to the water collector. Next, when the night comes, the temperatures drops below the transition temperature again; accordingly, the water sorbing material will automatically convert its conformation and to be prepared to the next morning's fog. The whole system is driven by the nature, the sun light, and no any human input energy is required.

Therefore, such device may be placed in many coastal arid regions around the world. Moreover, the water sorbing material may be used independently. Alternatively, it may be grafted on the surface of a supporting element. In such a way, the contacting area of the sorbing material to the moisture in the air is significantly increased, which will further increase the water collection efficiency of the device.

It is also possible to utilize the mechanical pressure exerted by the thermo-responsive polymer when it undergoes the transition. This pressure might be small but it may be harvested by using piezoelectric material that may generate electricity when a pressure is applied on them.

In many places of the world, water is not adequate or even scarce. In addition, the availability and/or cost of energy may be not desirable. In this regard, an efficient, convenient and low cost device or process for collecting water from sources such as atmospheric moisture is always in urgent need.

Accordingly, in some embodiments, a water collection device is provided to collect water from the atmospheric moisture, which is highly efficient, easy to use, with low cost, and meanwhile, does not need energy input except for solar radiation. In some embodiments of the present invention, it has provided that this device includes a type of water sorbing material, a porous protection wall and a water container. In some embodiments of the present invention, it has further provided that the water sorbing material could be certain temperature responsive polymer with a phase separation temperature. In this way, when its temperature is below phase separation temperature, the temperature responsive polymer is in a swollen hydrated state, forming hydrogen bond with water molecules; so as to sorb water from the air. Further, when its temperature is above that phase separation temperature, the temperature responsive polymer is in a shrunken dehydrated state, forming hydrogen bond with other temperature responsive polymer molecules; so as to expel the water to the water container.

In some embodiments, the water collection devices provide a desirable way to collect water directly from atmospheric moisture. More importantly, it does not need any extra energy in addition to solar radiation. Therefore, it has significant technical and economical advantages.

In some embodiments, a water harvesting device may include a first thermo-responsive polymer that sorbs water at temperatures below a lower critical solution temperature and desorbs water above the lower critical solution temperature; and a second thermo-responsive polymer that sorbs water at temperatures above an upper critical solution temperature and desorbs water at temperatures below the upper critical solution temperature. In some embodiments, a method of harvesting water may include exposing a first thermo-responsive polymer and a second thermo-responsive polymer to an environment, wherein the first thermo-responsive polymer sorbs water at temperatures below a lower critical solution temperature and desorbs water at temperatures above the lower critical solution temperature and wherein the second thermo-responsive polymer sorbs water at temperatures above an upper critical solution temperature and desorbs water at temperatures below the upper critical solution temperature; and collecting water desorbed from at least one of the first thermo-responsive polymer and the second thermo-responsive polymer.

As a first embodiment of the invention, there is provided a device for collecting water from atmospheric moisture, comprising
    a water sorbing material;
    a protection wall;
    a water container;
    the water sorbing material sorbing water from the atmospheric moisture;
    the protection wall protecting the water sorbing material and the water collector from being contaminated or damaged;
    the protection wall allowing air to pass through with no hindrance; and
    the water container being connected to the water sorbing material so as to collect the water from the water sorbing material.

In some embodiments, the protection wall is in a porous form to allow air with moisture to pass through; and the protection wall is made of a material that does not allow sorbing moisture in air.

In some embodiments, the water container is made of a material that does not allow sorbing moisture in air; and the water container comprises means to prevent the water contained in the container from evaporating to air.

In some embodiments, the device comprising the water sorbing material being a temperature responsive polymer with a phase separation temperature;
    the temperature responsive polymer undergoing water solubility change when its temperature goes from above (and/or below) the phase separation temperature to below (and/or above) the phase separation temperature;
    the temperature responsive polymer undergoing water solubility change when its temperature goes from below (and/or above) the phase separation temperature to above (and/or below) the phase separation temperature;
    when its temperature is below (and/or above) the phase separation temperature, the temperature responsive polymer being in a swollen hydrated state, and the temperature responsive polymer forming hydrogen bond with water molecules;
    when its temperature is below (and/or above) the phase separation temperature, the temperature responsive polymer sorbing water from atmospheric moisture;
    when its temperature is above (and/or below) the phase separation temperature, the temperature responsive polymer being in a shrunken dehydrated state, and the temperature responsive polymer forming hydrogen bond with side groups of adjacent temperature responsive polymer molecule; and
    when its temperature is above (and/or below) the phase separation temperature, the temperature responsive polymer expelling water from its structure.

In some embodiments, the phase separation temperature is between 20° C. and 40° C.

In some embodiments, the phase separation temperature is adjustable from 5° C. to 90° C.; and the phase separation temperature being adjusted via altering type of the temperature responsive polymer, concentration of the temperature responsive polymer, or modifying the temperature responsive polymer's structure.

In some embodiments, the temperature responsive polymer being a standing alone component of the device, or the temperature responsive polymer being grafted on a surface of a supporting element.

As another embodiment of the invention, there is provided a device for collecting water from atmospheric moisture, comprising
    a water sorbing material;
    a protection wall;
    a water container;
    the water sorbing material sorbing water from the atmospheric moisture;
    the protection wall protecting the water sorbing material and the water collector from being contaminated or damaged;
    the protection wall allowing air to pass through with no hindrance;
    the water container being connected to the water sorbing material so as to collect the water from the water sorbing material;
    the protection wall being in a porous form to allow air with moisture to pass through;
    the protection wall being made of a material that does not allow sorbing moisture in air;
    the water container being made of a material that does not allow sorbing moisture in air; and
    the water container comprising means to prevent the water contained in the container from evaporating to air.

In some embodiments, the device comprising:
    the water sorbing material being a temperature responsive polymer with a phase separation temperature;
    the temperature responsive polymer undergoing water solubility change when its temperature goes from above (and/or below) the phase separation temperature to below (and/or above) the phase separation temperature;
    the temperature responsive polymer undergoing water solubility change when its temperature goes from below (and/or above) the phase separation temperature to above (and/or below) the phase separation temperature;

when its temperature is below (and/or above) the phase separation temperature, the temperature responsive polymer being in a swollen hydrated state, and the temperature responsive polymer forming hydrogen bond with water molecules;

when its temperature is below (and/or above) the phase separation temperature, the temperature responsive polymer sorbing water from atmospheric moisture;

when its temperature is above (and/or below) the phase separation temperature, the temperature responsive polymer being in a shrunken dehydrated state, and the temperature responsive polymer forming hydrogen bond with side groups of adjacent temperature responsive polymer molecule; and when its temperature is above (and/or below) the phase separation temperature, the temperature responsive polymer expelling water from its structure.

In some embodiments, the phase separation temperature is between 20 degrees C. and 40 degrees C., although other phase separation temperatures outside of that range are permitted;

In some embodiments, the device comprising:
the phase separation temperature being adjustable from 5° C. to 90° C.; and
the phase separation temperature being adjusted via altering type of the temperature responsive polymer, concentration of the temperature responsive polymer, or modifying the temperature responsive polymer's structure.

In some embodiments, the device for collecting water from atmospheric moisture comprising
the temperature responsive polymer being a standing alone component of the device, or
the temperature responsive polymer being grafted on a surface of a supporting element.

As another embodiment of the invention, there is provided a device for collecting water from atmospheric moisture, comprising:
a water sorbing material;
a protection wall;
a water container;
the water sorbing material sorbing water from the atmospheric moisture;
the protection wall protecting the water sorbing material and the water collector from being contaminated or damaged;
the protection wall allowing air to pass through with no hindrance;
the water container being connected to the water sorbing material so as to collect the water from the water sorbing material;
the protection wall being in a porous form to allow air with moisture to pass through;
the protection wall being made of a material that does not allow sorbing moisture in air;
the water container being made of a material that does not allow sorbing moisture in air;
the water container comprising means to present the water contained in the container from evaporating to air;
the water sorbing material being a temperature responsive polymer with a phase separation temperature;
the temperature responsive polymer undergoing water solubility change when its temperature goes from above (and/or below) the phase separation temperature to below (and/or above) the phase separation temperature;

the temperature responsive polymer undergoing water solubility change when its temperature goes from below (and/or above) the phase separation temperature to above (and/or below) the phase separation temperature;

when its temperature is below (and/or above) the phase separation temperature, the temperature responsive polymer being in a swollen hydrated state, and the temperature responsive polymer forming hydrogen bond with water molecules;

when its temperature is below (and/or above) the phase separation temperature, the temperature responsive polymer sorbing water from atmospheric moisture;

when its temperature is above (and/or below) the phase separation temperature, the temperature responsive polymer being in a shrunken dehydrated state, and the temperature responsive polymer forming hydrogen bond with side groups of adjacent temperature responsive polymer molecule;

when its temperature is above (and/or below) the phase separation temperature, the temperature responsive polymer expelling water from its structure; and the temperature responsive polymer being a standing alone component of the device, or
the temperature responsive polymer being grafted on a surface of a supporting element.

In some embodiments, the phase separation temperature being adjustable from 5° C. to 90° C.; and the phase separation temperature being adjusted via altering type of the temperature responsive polymer, concentration of the temperature responsive polymer, or modifying the temperature responsive polymer's structure.

What is claimed is:

1. A water collection device comprising:
one or more water sorbing materials including at least a first thermo-responsive polymer that sorbs water at temperatures above an upper critical solution temperature and desorbs water below the upper critical solution temperature, wherein the first thermo-responsive polymer includes poly(acrylamide-acrylic acid) copolymer.

2. The water collection device of claim 1, wherein the first thermo-responsive polymer forms a hydrogen bond with water at temperatures above the upper critical solution temperature.

3. The water collection device of claim 1, wherein the first thermo-responsive polymer forms a hydrogen bond with adjacent functional groups attached to the first thermo-responsive polymer at temperatures below the upper critical solution temperature.

4. The water collection device of claim 1, wherein the upper critical solution temperature is in the range of about 5 degrees C. to about 75 degrees C.

5. The water collection device of claim 1, wherein the upper critical solution temperature is about 22 degrees C.

6. The water collection device of claim 1, wherein the one or more water sorbing materials further includes a second thermo-responsive polymer that sorbs water at temperatures below a lower critical solution temperature and desorbs water above the lower critical solution temperature.

7. The water collection device of claim 6, wherein the second thermo-responsive polymer forms a hydrogen bond with water at temperatures below the lower critical solution temperature.

8. The water collection device of claim 6, wherein the second thermo-responsive polymer forms a hydrogen bond with adjacent functional groups attached to the second thermo-responsive polymer at temperatures above the lower critical solution temperature.

9. The water collection device of claim 6, wherein the second thermo-responsive polymer includes one or more of poly(N-isopropylacrylamide), poly(vinylphosphonate), hydroxypropylcellulose, poly(vinylcaprolactame), and polyvinyl methyl ether.

10. The water collection device of claim 6, wherein the lower critical solution temperature is in the range of 20 degrees C. and 40 degrees C.

11. The water collection device of claim 6, wherein the lower critical solution temperature is about 32° C.

12. The water collection device of claim 6, wherein the lower critical solution temperature is greater than or equal to the upper critical solution temperature.

13. The water collection device of claim 6, further comprising a solar collector for heating the one or more water sorbing materials above the upper critical solution temperature and optionally the lower critical solution temperature.

14. The water collection device of claim 6, further comprising a passive radiative cooler for cooling the one or more water sorbing materials below the upper critical solution temperature and optionally the lower critical solution temperature.

15. A method of harvesting water comprising:
exposing one or more water sorbing materials to an environment, wherein the one or more water sorbing materials includes at least a first thermo-responsive polymer that sorbs water at temperatures above an upper critical solution temperature and desorbs water at temperatures below the upper critical solution temperature, wherein the first thermo-responsive polymer includes poly(acrylamide-acrylic acid) copolymer; and
collecting water desorbed from the first thermo-responsive polymer.

16. The method of claim 15, wherein the one or more water sorbing materials further includes a second thermo-responsive polymer that sorbs water at temperatures below a lower critical solution temperature and desorbs water at temperatures above the lower critical solution temperature.

17. The method of claim 16, wherein the upper critical solution temperature and the lower critical solution temperature are in the range of about 20 degrees C. to about 40 degrees C.

* * * * *